United States Patent Office 3,823,077
Patented July 9, 1974

---

3,823,077
ELECTROLYTIC PROCESS FOR PREPARING DIALKYLTIN COMPOSITIONS
Harris Ellsworth Ulery, Newark, Del., assignor to E. I. du Pont de Nemours and Company, Wilmington, Del.
No Drawing. Continuation-in-part of abandoned application Ser. No. 191,903, Oct. 22, 1971. This application Aug. 3, 1972, Ser. No. 277,603
Int. Cl. C07b 29/06; C07f 7/22
U.S. Cl. 204—59 QM
22 Claims

ABSTRACT OF THE DISCLOSURE

An electrolytic process for preparing dialkyltin compositions by electrolyzing a $C_{1-10}$ alkyl chloride or bromide in contact with a liquid electrolyte and a tin cathode at a current density sufficiently high to effect formation of said dialkyltin compositions.

CROSS-REFERENCE TO RELATED APPLICATIONS

This application is a continuation-in-part of application Ser. No. 191,903, filed Oct. 22, 1971, now abandoned.

BACKGROUND OF THE INVENTION

1. Field of the Invention

This invention relates to a novel electrolytic process for preparing dialkyltin compositions, particularly dialkyltins, dialkyltin oxides, and dialkyltin dihalides. Various compositions prepared according to the process of this invention are useful as intermediates, vulcanizing agents and stabilizers for plastics.

2. Description of the Prior Art

Alkyltin compositions are known to have varied uses. One important class of commercially important dialkyltin compositions comprises tetravalent dialkyltin compositions wherein the unsatisfied valences are satisfied by halogen atoms, an oxygen atom or organic radicals joined to the tin through an oxygen atoms, e.g., in alkoxides and carboxylates. Such compositions find wide utility as stabilizers for plastics, vulcanizing agents for silicone elastomers, biocides, anthelmintics, catalysts for esterifications and as intermediates through which other tetravalent dialkyltin compositions are prepared for specialized uses.

Dialkyltin dihalides, such as dibuyltin dichloride and dioctyltin dichloride, and dialkyltin oxides, particularly dbutyltin oxide and dioctyltin oxide, are becoming increasingly important as intermediates for preparing such commercial products as dibutyltin diacetate, dibutyltin dilaurate, dioctyltin dilaurate and the like and as independent articles of commerce for the uses heretofore described. Existing methods for preparing such key intermediates as the dialkyltin dihalides involve costly and time consuming operations. One such process involves first preparing the tetraalkyltins, then degrading them to the dialkyltin compositions, for example by reaction with halogen.

Another process involves reacting preformed tetraalkyltin with a stannic halide to form redistribution mixtures of the various possible tetravalent alkyltin halides. Still another process involves direct reaction of tin with alkyl halides. This process, even with the use of catalysts, requires rather high temperatures and pressures and extended periods of time to effect the desired results. The dialkyltin oxides are ordinarily prepared from the dihalides by treatment with alkali so that their synthesis is even more lengthy and costly.

Silversmith and Sloan in U.S. 3,197,382 disclose the preparation of tetraalkyltins (among other organo metal compositions) by the electrolytic reduction of alkyl esters (including alkyl halides) at a tin cathode (or other sacrificial metal cathode according to the organo metal to be prepared). Cleaving alkyl groups from the tetraalkylated product by breaking the alkyltin bond in order to obtain alkyltins having less than 4 alkyls per tin atom would constitute a waste of the electricity already utilized and required to form those alkyltin bonds in the electrolytic process.

Russian Pat. 184,853 discloses preparation of alkyltin halides by electrolyzing a mixture of alkyl halides and tin salts at a magnesium cathode, e.g., electrolyzing butyl bromide and tin chloride in butyl acetate in contact with a magnesium cathode and a graphite anode while gradually adding bromine during the electrolysis yielded a mixture of dibutyltin dibromide and tribuyltin bromide.

Heretofore the art in the production of alkyltin compositions for commercial use has been concerned largely with tetravalent alkyltin compositions. Divalent dialkyltins are known; however, they are reported to be very susceptible to oxidation, to have no commercial value and to be troublesome as byproducts in the synthesis of the desired tetravalent compounds. (See Advances in Chemistry Series, "Organotin Compounds," by H. E. Hirschland and C. K. Banks, Metal & Thermit Corp., New York, N.Y., pages 204–211.)

A process has now been discovered for preparing alkyltin compositions containing less than 4 alkyl groups per tin atom, which process: (1) avoids the stringent conditions of temperature and pressure required to produce alkyltin halides by direct reaction of tin with alkyl halides; (2) avoids the necessity of proceeding via cleavage of alkyl group from tetraalkyltins to the desired compositions; (3) makes it possible to control the electrolytic reductive alkylation of tin so as to obtain divalent dialkyltins as intermediates; (4) makes it possible to use lower cost alkyl chlorides in place of the alkyl bromides normally used in the art, and (5) provides an economically attractive process for the preparation of dibutyl- and dioctyltin derivatives, particularly the oxides.

SUMMARY OF THE INVENTION

The present invention is directed to an electrolytic process for preparing dialkyltin compositions which comprises electrolyzing a $C_{1-10}$ alkyl chloride or bromide in contact with a liquid electrolyte and a tin cathode at a current density of from about 0.02 to about 0.2 amp./sq. cm. which is sufficiently high to effect formation of said dialkyltin compositions.

DESCRIPTION OF THE INVENTION

In the present process it is seen that, unexpectedly, by employing alkyl chlorides or alkyl bromides, by operating at relatively high current densities, by relating the current density to the size of alkyl group and to the nature of the halogen moiety of the alkyl halide, and by the selective use of single compartment or membrane-divided cell, the reductive alkylation of the tin cathode can be controlled to produce dialkyltin compositions. Further, the process can be controlled to proceed as a 2 Faraday process (i.e., 2 electrons consumed per atom of tin) to the divalent dialkyltin (equation 1). This is in contrast to the art-known tetraalkylation which requires 4 Faradays of electricity.

(1) $2RX + Sn + 2e^- \rightarrow R_2Sn + 2X^-$, where R is alkyl and X is Cl or Br.

Thus the dialkyltin compositions that can be produced by this invention include tetravalent dialkyltin compositions, such as dialkyltin dihalides and oxides, and divalent dialkyltin compositions. By divalent dialkyltin compositions as used herein is meant compositions consisting essentially of alkyl groups and tin atoms in an alkyl/tin ratio of about 2/1. These compositions are believed to be open chain or cyclic dialkyltin polymers having $R_2Sn$ units (Equation 2) and presumably have tin-tin bonds.

(2) $xR_2Sn \rightarrow (R_2Sn)_x$ where $x$ is an integer greater than 1.

The belief that these compositions are dialkyltin polymers is supported by the fact that they are insoluble in the electrolytes contemplated herein (and thus are readily recoverable in this form if desired). However, they react like simple dialkyltin, e.g., they undergo reaction with $O_2$ to form dialkyltin oxides (equation 3) and with halogens exemplified by $Cl_2$ to form dialkyltin chlorides (equation 4).

(3) 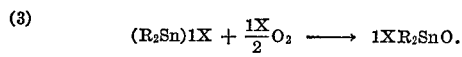

(4) 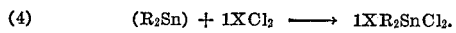

Another unexpected aspect of the process of this invention is that when the primary product of the reductive alkylation of the tin cathode is a divalent dialkyltin composition, it can be converted in situ during the course of the electrolysis into tetravalent dialkyltin compositions.

Thus the process of this invention is high versatile and applicable to direct production of divalent dialkyltin compositions and to substantially direct production of tetravalent dialkyltin compositions, particularly dialkyltin oxides, dialkyltin dichlorides and dialkyltindibromides.

The present invention is directed to an electrolytic process for preparing dialkyltin compositions which comprises electrolyzing a $C_{1-10}$ alkyl chloride or bromide in contact with a liquid electrolyte and a tin cathode. The process can be readily controlled by simple means (e.g., the use of a permselective partition to segregate the alkyltin products of the cathodic reaction from the normally oxidzing products of the cell-balancing anodic reaction) to produce divalent dialkyltin and, where desired, dialkyltin oxide and dialkyltindichlorides and dibromides. The nature of the final product depends on the presence or absence of constituents in the catholyte (i.e., electrolyte in contact with the tin cathode) which are reactive towards divalent dialkyltin.

Divalent dialkyltin is produced at the cathode in insoluble and recoverable form by employing a defined $C_2-C_{10}$ alkyl halide-liquid electrolyte in contact with the tin cathode that is substantially inert towards said divalent dialkyltin preferably in a cell wherein the tin cathode and supporting catholyte are separated from a suitable anode with supporting cell-balancing anolyte by a permselective current-permeable membrane. The divalent dialkyltin can, if desired, be recovered and subsequently converted to tetravalent dialkyltin compositions directly by chemical reaction under moderate conditions, such as direct combination with molecular oxygen to form dialkyltin oxides or with chlorine or bromine to form dialkyltin dihalides.

Tetravalent dialkyltin compositions can be obtained substantially directly by incorporating into the alkyl chloride-liquid electrolyte composition substances that convert divalent dialkyltin to tetravalent dialkyltin and that otherwise do not prevent the reductive alkylation reaction producing divalent dialkyltin. For example, dialkyltin oxides are obtained substantially directly by contacting the electrolyzed alkyl halide-electrolyte composition in situ with molecular $O_2$, either batchwise or continuously, before or after insoluble dialkyltin is seen to form in the electrolyte.

In still another embodiment, dialkyltin dihalides are produced by including in the electrolyte a source of chloride or bromide ions, anodically oxidizing said halide ions while cathodically reducing said alkyl halide, and allowing the anodic and the cathodic reaction products to interact in situ within the electrolysis zone.

When the product selected for production, the reduction of alkyl chloride or bromide as defined, is the primary step underlying the various embodiments. This requires utilization of an electrolyte which is capable of carrying current to a practical degree, i.e., sufficient to allow the reaction to proceed at a practical rate, and is otherwise substantially inert. Normally such electrolyte will consist essentially of the alkyl halide, a current-carrier and a solvent component for said carrier which is substantially inert to the other components of the cell in which the process is carried out and is so constituted that it is not reduced in preference to the alkyl halide at the tin cathode, i.e., nothing should be in the system which is more active than the alkyl halide which might react, instead of the alkyl halide, thus preventing the reaction of the alkyl halide with the tin.

To obtain the divalent dialkyltin composition as recoverable products the catholyte must be nondestructive of the divalent dialkyltin, i.e., the alkyl halide-electrolyte composition will be free of substances that destroy the alkyltin bonds or convert the dialkyltins into tetravalent tin compositions and will be substantially free of oxygen. Also, the alkyl halide should contain at least 2 carbons, preferably 4 or more carbon atoms.

Furthermore, since the anodic products of the reaction are normally oxidatively capable of reacting with divalent dialkyltin and may do so under conditions of the process, a permselective membrane may be employed to segregate the cathodic reaction system from the anodic reaction system. The membrane should be capable of passing current carrying ions of the electrolyte while restricting passage of the anodic oxidation products into the cathode compartment and vice versa.

When no membrane is utilized, the electrolyte composition (i.e., alkyl halide-electrolyte) consists essentially of a $C_1-C_{10}$ alkyl halide and a supporting conductive medium which does not interfere with the primary step of alkylating tin. To be non-interfering, the composition should contain no constituents which are more easily reduced at the tin cathode so as to prevent alkyltin formation or which are destructive of the tin cathode.

The alkyl halide may contain up to 10 carbon atoms, preferably at least 2 carbon atoms, and may be straight chain or branched chain. Included are methyl chloride, ethyl chloride, n-propyl, isopropyl chloride, n-butyl chloride, isobutyl chloride, isoamyl chloride, n-hexyl chloride, n-octyl chloride, isooctyl chloride, n-decyl chloride, and the corresponding bromides. Most preferred are the $C_4-C_8$ primary alkyl chlorides and bromides, particularly the n-butyl and n-octyl compounds for reasons of the established commercial importance of the butyltin and octyltin derivatives.

The current-carrier should provide current carrying ions and be soluble in the electrolyte composition to the extent necessary to impart conductivity of at least 0.001 ohm cm.$^{-1}$, preferably at least 0.01 ohm cm.$^{-1}$, and as high as practical. Also the current-carrier should have a reduction potential sufficiently high so that it does not preferentially reduce and in this way prevent the alkylation of tin from occurring. Satisfactory for this use are quatervents. Tetraalkyl ammonium chlorides and bromides and sulfonates, which are well known for their use as current-carriers in electrochemical processes. They have relatively high reduction potentials and are capable of imparting conductivity to aqueous and nonaqueous solvents. Tetraalkyl ammonium chlorides and bromides wherein each alkyl has 1–18 carbons constitute a preferred class and particularly preferred are those having from 1–4 carbons, more particularly 1–2 carbons. Some representative compounds are: tetramethyl ammonium chloride, tetraethyl ammonium chloride, tetra(n-butyl ammonium)chloride, dimethyldioctadecyl ammonium chloride, trimethyloctadecyl ammonium chloride and the corresponding bromides.

Dialkyltin dichlorides and dibromides and trialkyltin chlorides and bromides are also suitably conductive and can be used as current-carriers in this invention, particularly the di($C_1-C_{10}$ alkyl)tin dichlorides and dibromides, most preferably the di($C_1$–$C_2$ alkyl)tin compounds. These are particularly suitable for use as the sole current-carrier in the single compartment cell embodiment wherein the cathodically produced alkylated tin compositions are allowed to interact in situ with anodically produced halogen, preferably bromine, to form dialkyltin dihalide, preferably dibromide. Since the dialkyltin dihalides tend to form complexes with the tetraalkylammonium halides usually used herein as current-carriers, which complicates the recovery of the dihalides themselves as the primary products of the reaction, use of the dialkyltin dihalide current-carrier avoids the problem of separating the dialkyltin dihalide from the electrolyte and greatly facilitates recovery of this product. The dialkyltin dihalide may be recovered as such on distillation or as the oxide by hydrolyzing the reaction mixture with alkali under conditions well known to the art for converting dihalide to oxide and recovering the dialkyltin oxide by filtration, etc. as described before.

Since the alkyl chloride or bromide itself is not sufficiently polar to normally serve as solvent for the current-carrier, the catholyte composition will ordinarily contain an organic polar solvent, which may be an aqueous or nonaqueous system. Preferably the solvent is capable of solubilizing the alkyl chloride or bromide thereby facilitating reaction at the cathode. Preferably, too, the solvent taken together with the other electrolyte components is a non-solven for the polymeric dialkylin composition, to facilitate its recovery where this is desired, and preferably too, it is a non-solvent for the dialkyltin oxide to facilitate its recovery by filtration. Preferably, too, the catholyte is a solvent for dialkyltin dihalides, trialkyltin halides, and tetraalkyltins that may be formed as by-products of dialkyltins. Acetonitrile has been found satisfactory in all these respects. Other lower ($C_1$–$C_4$) alkano-nitriles such as propionitrile and butyronitrile may, however, also be used. Still other polar media that may be used include amides such as N,N-dimethylformamide, N,N-diethylacetamide, and hexamethyl phosphoramide.

Although polar nonaqueous and non-hydroxylic organic solvents are desirably employed for their inertness and ability to provide homogeneous media containing both the polar current-carrier and the relatively non-polar alkyl halides, it is sometimes beneficial to include water or other hydroxylic component, such as alkanols having 1–4 carbon atoms, ethylene glycol, propylene glycol, glycerol, polyethyleneglycol or the like organic hydroxylic compound which is miscible with said polar nonaqueous solvent, in moderate amounts consonant with the desirability of maintaining a homogeneous catholyte. The hydroxylic component tends to suppress breakup of the tin resulting in sludge formation. The amounts used in conjunction with nonaqueous organic solvents are usually in the range 1–5% by weight of the electrolyte composition although up to 20% by weight may be used to advantage.

In the membrane-divided cells it is necessary, of course, to provide an anolyte to complete the conductivity path between cathode and anode. For this purpose electrolyte compositions described above may be used as catholyte and the same composition, but omitting the alkyl halide as an unnecessary component, may be used as the anolyte. Still other anolyte compositions may be used advantageously as described below. It is also necessary in membrane-divided cells that the cell contain an oxidizable (i.e., electron transfer) component for reaction at the anode and thereby balance the cell electrochemically. While any cell-balancing anolyte may be used in membrane-divided cells, it is convenient to use in both divided and undivided cells a chloride or bromide ion source serving both as current-carrier and electron transfer component to the anode, e.g., $2Br^- - 2e \rightarrow Br_2$, as discussed further below.

In divided cells the anolyte will preferably consist essentially of a solution of a tetraalkyl ammonium halide, as described above, in a concentration sufficient to provide an anolyte having a conductivity of at least 0.001 ohm cm.$^1$, in an inert solvent having an oxidation potential higher than the current-carrying tetraalkyl ammonium monohalide. The solvents, which have been disclosed to be suitable for use in the catholyte, are also suitable for use in the anolyte. Usually, the solvent in the anolyte will consist of at least one solvent of the group consisting of water, an alkanol of 1–4 carbon atoms, and an alkanonitrile of 1–4 carbon atoms. The tetraalkyl ammonium monohalide, employed in the anolyte, may be the same as or different from that employed in the catholyte, but usually will be the same. Preferably, it will be a bromide. Also, preferably, the alkyl groups in the tetraalkyl ammonium monohalide in the anolyte will have 1–2 carbon atoms, e.g., tetraethyl ammonium monobromide or tetramethyl ammonium monobromide.

Proportions of the various electrolyte components are not critical and may vary widely so long as there are present sufficient quantities of each of the current-carrier, the solvent and the alkyl chloride or bromide to provide a conductive liquid medium and to produce dialkyltin compositions in recoverable amounts. Normally the catholyte comprises from about 5–35 wt. percent alkylating agent (preferably 10–30%), from about 1–20 wt. percent current-carrier (preferably 5–15%) the remainder being solvent as previously defined. The anolyte in membrane-divided cells normally comprises from about 1–25 wt. percent current-carrier (preferably 10–20%) the remainder being solvent. In single-compartment cells the catholyte is the total electrolyte.

The reductive alkylation reaction of the present process proceeds under mild conditions and normally is conducted at temperatures of from 20 to 60° C. although temperatures as low as about 0° C. and as high as about 100° C. can be used if desired. The operating pressure should be sufficient to maintain both the electrolyte and the alkyl halide in the liquid phase. Atmospheric pressures generally suffice with the alkyl halides having 4 or more carbons; however, higher or lower pressures may be used provided the liquid nature of the electrolyte and the alkyl halide is maintained.

The electrolysis is accomplished by passing a direct current across the cell, i.e., through the cathode, the catholyte, the cell membrane, when present, the anolyte and the anode. The operating voltage is not critical so long as it is sufficient to overcome the resistance of the cell (including that of the electrolyte and of the cell membrane when employed) and to reduce the alkyl halide at the cathode and to simultaneously effect the cell-balancing reaction of the anode, thereby establishing current flow. Normally a potential difference of at least about 3 volts and not more than 40 volts is required for satisfactory operation.

Current densities of from about 0.02 to 0.2 amp./cm.$^2$ are normally employed, preferably at least about 0.05 amp./cm.$^2$ as it has been found that the higher densities promote the production of dialkyltin as a separate recoverable entity. Also increasing the size of the alkyl group of the alkylating agent promotes formation of dialkyltin. Further, the smaller the alkyl group, and the higher the atomic number of the halide moiety of the alkylating agent, the higher the current density should be in order to promote the formation of dialkyltin in the electrolyte. For example, with alkyl halides having less than 4 carbons current densities of at least about 0.1 amp./cm.$^2$ are desirably employed.

The current density, the nature of the alkyl halide and the supporting electrolyte can readily be coordinated according to the principle underlying the invention such that substantially less than 4 electrons, usually less than 3 electrons, are consumed per atom of tin lost from the cathode during the course of the alkylation. It will be appreciated that side reactions, including electrolysis of hydroxylic compounds when present and the overvoltage for such reaction of the tin cathode is exceeded, decomposition of alkyl halide to form hydrocarbons, and alkylation of tin beyond the dialkyl stage will contribute to the consumption of more than 2 Faradays of electricity in the dialkylation reaction.

As the reductive alkylation proceeds (and in the absence of oxygen or other substance capable of combining with the tin atom in its divalent state) divalent dialkyltin begins to precipitate from the electrolyte as a brownish colored flocculent solid. The precipitate can be separated from the electrolyte, if desired, by decantation, filtration, centrifugation or the like. If it is so separated, it should be maintained in an inert atmosphere since such dialkyltin composition tends to be spontaneously flammable in air. The filtered material can be resuspended in a suitable diluent such as water or acetonitrile and treated with oxygen, air or other molecular $O_2$-containing gas, preferably air, to obtain dialkyltin oxide. Preferably solid dialkyltin isolated by filtration should be freshly prepared when used for conversion to dialkyltin oxide since the solid tends to darken with age and form a gum of reduced activity towards air.

Preferably for commercial operation the divalent dialkyltin composition will be removed as formed along with a portion of the catholyte as carrier and treated with said $O_2$-source. The resulting dialkyltin oxides are normally solid and insoluble in the common solvents and thus are conveniently recovered by filtration.

Removal of divalent dialkyltin and conversion to dialkyltin oxide can be carried out continuously or intermittently if desired by removing a portion of the catholyte continuously or intermittently, intimately mixing it with the $O_2$-source, forming the dialkyltin oxide as an insoluble precipitate, separating the dialkyltin oxide from the catholyte composition and recycling the catholyte to the electrolysis zone for further reaction of its alkyl halide content with the tin cathode.

The reaction between freshly formed divalent dialkyltin and oxygen proceeds via a yellow-brown intermediate (presumably a peroxide) which then goes over to the white oxide. Where the alkyl groups contain up to about 8 carbons the transformation can be essentially completed in a short time at ordinary temperatures of from 20–60° C. Since such temperatures normally are the temperatures of the catholyte during the electrolysis they will be preferred for this conversion; higher or lower temperatures may be employed, however, to moderate the reaction or to accelerate it where desired or necessary.

It also has been discovered that formation of dialkyltin oxide can be effected within the electrolysis zone itself, by having an $O_2$-source present in the catholyte, for example by sparging air into it, during the reductive alkylation stage of the reaction. This is quite unexpected since $O_2$ is inherently capable of being reduced at the cathode. It is therefore not necessary to await the precipitation of divalent dialkyltin or to effect reaction of said dialkyltin in a separate step in a zone external to the reductive alkylation zone. Practically speaking, this embodiment constitutes a one-step electrolytic process for the preparation of dialkyltin oxides. To facilitate product recovery by filtration, the electrolyte should be so constituted in this and the other embodiments described above so as to be a non-solvent for the dialkyltin oxide.

It will be noted that in addition to the dialkyltin products there may also be produced other alkyltin compounds such as trialkyltin halide and tetraalkyltin. Trialkyltin halide formation is attributed to direct chemical reaction between divalent dialkyltin and unreacted alkyl halide (equation 5).

(5) $RX + R_2Sn \rightarrow R_2SnX$, where X=Cl or Br.

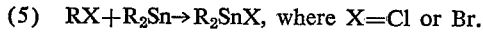

The trialkyltin content of the electrolyte composition may be recovered using art-known means, conveniently by adding alkali to the recovered electrolyte to form insoluble trialkyltin hydroxide or bis(trialkyltin)oxide. Such compounds are useful for many of the uses described for the dialkyltin oxides.

In the divided cell embodiment, tetraalkyltin may appear in varying amounts in the catholyte. The tetraalkyltins as a class are soluble in the organic catholytes contemplated herein and are readily recovered therefrom by distillation or other conventional means. The bulk of the alkyltin products is distributed between divalent dialkyltin and tetraalkyltin, with the amount of tetraalkyltin inversely proportioned to that of the dialkyltin product. The amount of trialkyltin halide produced usually corresponds to less than about 20% of the total amount of tin consumed from the cathode.

In the single compartment cell, tetraalkyltin, if formed, tends to be converted to dialkyltin dihalide and trialkyltin halide by the halogen product of the anodic reaction. Dialkyltin dihalide may also be formed by direct combination of divalent dialkyltin and halogen. Surprisingly, once the dialkyltin becomes insolubilized (polymerized) in the electrolyte, the reaction between it and the anodically produced halogen becomes relatively slow so that the insoluble product can be recovered.

As stated above, it is convenient to employ a halide ion current-carrier in the anolyte. Thus during the electrolysis halide ion is produced at the cathode; at the same time at the other side of the membrane halide ion is oxidized at the anode to halogen. Such halogen reacts with the current-carrying tetraalkyl ammonium monohalide of the anolyte to form a complex tetraalkyl ammonium polyhalide which, in the presence of excess tetraalkyl ammonium monohalide, normally is the trihalide, $R_4NX_3$, and in some cases the pentahalide, $R_4NX_5$ or mixtures thereof averaging $R_4NX_4$. Such tetraalkyl ammonium polyhalides normally are solids and are fairly insoluble in water, but are more soluble in alkanols and alkanonitriles. The tetraalkyl ammonium polyhalides can be recovered from the anolyte solutions, most readily from the solutions of current-carrying tetraalkyl ammonium monohalide in water, and then treated by known methods (e.g., by steaming) to release the excess halogen as elemental halogen and to regenerate the current-carrying tetraalkyl ammonium monohalide. When the halide compounds employed are bromides, the alkyl groups of the current-carrying tetraalkyl ammonium monobromides contain 1–2 carbon atoms and the anolyte solvent is water, the tetraalkyl ammonium polybromides formed in the anolyte include the tribromides, the tetrabromides and the pentabromides, all of which are normally solids which are insoluble in the anolyte solution and separate therefrom. If the anolyte is maintained at a temperature of about 45° C. or above, such mixture of tetraalkyl (methyl and ethyl) ammonium polybromides separates from the anolyte solution as a water-immisicible, heavy liquid phase which can be most readily removed from the anode compartment.

As for the electrolytic cell itself, this normally comprises a tin cathode, an anode and preferably also a current-permeable partition which separates the cell into a cathode compartment and an anode compartment, thereby separating the catholyte from the anolyte. Usually, the effective surfaces of the electrodes will be spaced apart by about 0.2 to about 2 cm. The catholyte and the anolyte are placed in their respective compartments and an electrolyzing direct electric current is passed through the cell, i.e., from the cathode through the catholyte, the current-permeable partition and the anolyte to the anode. Electrolytic cells of the required type and the methods of operating them are conventional and well known in the art, and such electrolytic cells and methods may be used in the process of this invention.

The cathode may be in any suitable form presenting a large surface for a high rate of alkyltin formation.

The anode, in general, may be made of any suitable inert electrode material. Since halogen (e.g., $Cl_2$ or $Br_2$) is often produced in the anodic reaction the anode should be resistant to corrosion by such halogen. Platinum is suitable including Pt on Ti and Pt on Ta, and carbon may also be used.

A variety of permselective current permeable membranes are known to the art and may be employed as cell partitions in this process. It will be understood that such materials may differ considerably in their resistance to the flow of ions as current-carriers and to the flow of non-ionics such as water, nitrile solvent, and the alkyltin compositions. Suitable membrane materials are porous porcelain, asbestos, glass fiber paper, cellulosic substances such as porous cellophane and parchment, films or agar gel (supported on polyethylene screen or porous glass, for example), films of polyurethanes, polyvinylidene fluoride, porous polyethylene, polyvinyl butyral, and ion exchange resins. Cation exchange materials are preferred in the membrane-divided cells. They are particularly effective in permitting current-carrying ions to pass while segregating the alkyltin cathodic products from the halogen-containing products of the anodic reaction.

EXAMPLES

The following examples are intended to be merely illustrative of the invention and not in limitation thereof. Unless otherwise indicated, all quantities are by weight.

Example 1

The electrolytic cell used herein was a membrane-divided sandwich-type cell with a circular tin cathode facing a circular graphite anode, each presenting a 100 cm.² area 1 cm. apart, and equipped with circulating pumps for circulating catholyte and anolyte through the respective cathode and anode compartments.

The membrane was an American Machine and Foundry Co. polysulfonate type cation exchange resin membrane designated "Amphion C-310" and was held in place with "Vexar" plastic screens.

A catholyte consisting of 30% n-butyl chloride, 10% tetraethylammonium chloride, and 60% acetonitrile was circulated into and out of a reservoir through the cathode compartment, while an anolyte consisting of 20% tetraethylammonium bromide, 78% acetonitrile, and 2% $H_2O$ was circulated through the anode compartment, both electrloytes being maintained at about 29° C. and circulating at a rate of 500 ml./min. The current was turned on and the current density adjusted to .0486 amp./cm.² at a potential of 24 volts. No attempt was made to exclude air or moisture.

After about 10 minutes, a heavy flocculent brownish mass appeared in the catholyte. This was allowed to accumulate in the catholyte reservoir from time to time and set aside. After 90 minutes of operation all of the solid catholyte suspension which has accumulated in the reservoir was filtered and crude solid dibutyltin (36.2 g.) was collected. This solid was washed with and then suspended in hot acetonitrile. Next, the suspension was treated with a stream of air for several minutes, and a white dibutyltin oxide was formed, which was collected by simple filtration and identified by its infrared spectrum. The tin cathode lost 16.5 g. Sn during the process and the yield of dibutyltin oixde was 18.2 g. which represents 53% of 16.5 g. Sn loss of the cathode. The total current consumed was 0.272 Faraday or 1.95 electrons/atom tin lost on the average.

Example 2

The general procedures of Example 1 were followed, using as the anolyte a solution of 78% acetonitrile, 20% tetraethyl ammonium bromide and 2% water (500 g. total), and as the catholyte a solution of 10% tetraethyl ammonium chloride, 30% n-butyl chloride and 60% acetonitrile (500 g. total). The tin loss was 20.3 g., the current was 0.373 Faraday (2.18 electrons/tin atom), the current density was 0.05 amp./ cm.² and the time 120 minutes. The temperature range was 23°–40.5° C. Crude dibutyltin oxide (34.2 g. identified by infrared analysis) was recovered by aerating the catholyte outside the cell (in the reservoir of the circulation system) and filtering from the catholyte.

Example 3

The general procedures of Example 1 were followed using as the anolyte a solution of 75% acetonitrile, 20% tetraethyl ammonium bromide and 5% water (500 g. total) and as the catholyte 10% tetraethyl ammonium chloride, 15% n-butyl chloride, 74.5% acetonitrile, and 0.5% water (1000 g. total). Unlike Example 1, the system was purged with argon to exclude air. The tin loss was 3.3 g., current was .071 Faraday (2.55 electrons/tin atom), current density was 0.0168 amp./cm.² and the time 68 minutes. The temperature range was 20°–29° C. 4.3 Grams of a wet precipitate was recovered and this was aerated outside the cell in warm acetonitrile and filtered yielding 3.1 grams of dibutyltin oxide identified by infrared analysis.

Example 4

The general procedures of Example 1 were followed using as the anolyte a solution of 10% tetraethyl ammonium chloride and 90% acetonitrile (500 g. total) and as the catholyte 10% tetraethyl ammonium chloride, 30% n-butyl chloride and 60% acetonitrile (500 g. total). During the course of the reaction the anolyte was slowly bled into the catholyte with the anolyte so bled being replaced. The tin loss was 9.1 g., current was 0.28 Faraday (3.65 electrons/tin atom), the current density 0.025 amp./cm.² and the time 180 minutes. The temperature range was 8.9°–10° C. The resulting catholyte was aerated outside the cell by entrained air and there was recovered (1) 3.8 g. dibutyltin oxide by filtering the catholyte (identified) and (2) 11.1 g. crude $Bu_3SnCl$ by extracting the catholyte after dilution with water with petroleum ether and evaporating the petroleum ether.

Example 5

The general procedure of Example 1 were followed using as the anolyte a solution of 78% acetonitrile, 20% tetraethyl ammonium bromide and 2% water (500 g. total) and as the catholyte, 10% tetraethyl ammonium chloride, 30% n-octyl chloride and 60% acetonitrile (500 g. total). The tin loss was 10.7 g., current 0.218 Faraday (2.42 electrons/tin atom), current density 0.025 amp./cm.² and the time 140 minutes. The temperature range was 24°–40° C. Aeration took place during and after the run. Crude dioctyltin oxide (9 g. identified by infrared) was recovered by aerating the catholyte and filtering from the catholyte.

Example 6

The general procedures of Example 1 were followed using as the anolyte a solution of 89% acetonitrile, 10% tetraethyl ammonium bromide and 1% water (500 g. total) and as the catholyte, 10% tetraethyl ammonium chloride, 30% n-butyl chloride and 60% acetonitrile (500 g. total). The catholyte was aerated outside the cell in a circulation stream and 10.1 g. of crude dibutyltin oxide were recovered from the aerated catholyte by filtration. The tin loss was 12.8 g., current 0.28 Faraday (2.50 electrons/tin atom), current density 0.025 amp./cm.² and the time 180 minutes. The temperature range was 25°–35° C.

Example 7

The electrolytic cell used herein was a circular undivided sandwich-type cell having a tin cathode and a graphite anode each with an area of 100 cm.² and spaced about 1 cm. apart. An electrolyte consisting of by weight:

| | Percent |
|---|---|
| Tetraethyl ammonium chloride | 1 |
| Tributyltin chloride | 3 |
| Glycerol | 2 |
| n-Butyl chloride | 30 |
| Acetonitrile | 64 | and initially cooled to 16° C. was circulated at a rate=ca. 500 ml./min. The current was turned on and adjusted to give a current density=0.1 amp./cm.$^2$; the total cell potential required was 11.5 volts. The current was passed for 45 min. or until 0.28 Faraday (4.18 electrons/tin atom) had passed. During this time the electrolyte temperature rose to 37° C. and the voltage required fell to 8.5 volts. A dark polymeric form of Bu$_2$Sn precipitated during the run and was collected in a settling tank in the circulating stream Elemental analysis showed this crude material to be 44–49% Sn versus 51% expected for Bu$_2$Sn. The total tin loss from the cathode was 8 g. (or .0673 g. atoms). The relatively high electrical consumption in this run is attributed to cathodic reduction involving tributyltin chloride.

Example 8

The general procedures of Example 7 were followed using as the electrolyte a solution of 10% tetraethyl ammonium chloride, 10% n-butyl chloride and 80% acetonitrile. The tin loss was 14.6 g., current 0.28 Faraday (2.27 electrons/tin atom), current density 0.1 amp./cm.$^2$ and the time 45 minutes. The temperature range was 24°–39° C.

Bu$_2$Sn polymer (2.8 g.) was recovered by filtration. It was then suspended in acetonitrile, and treated with a stream of Cl$_2$ gas, whereupon the polymer dissolved.

Example 9

The general procedures of Example 7 were followed using as the electrolyte a solution of 10% tetraethyl ammonium chloride, 30% ethyl chloride and 69% acetonitrile (1000 g. total). The tin loss was 14 g., current 0.279 Faraday (2.35 electrons/tin atom) current density 0.1 amp./cm.$^2$ and the time 45 minutes. The temperature range was 18–20° C.

On filtration there was recovered a pyrophoric diethyltin as a dark solid. Elemental analysis showed it to be partially chlorinated, containing about 15% Cl and 60% Sn ((C$_2$H$_5$)$_2$Sn requires 67% Sn).

Example 10

The general procedure of Example 1 was followed using a tin cathode containing 1% lead and a much smaller sized (7 cm.$^2$ area electrodes) but otherwise comparable cell. The catholyte consisted of 20% n-propyl bromide, 6% tetraethylammonium bromide and 74% acetonitrile, the anolyte of 70% acetonitrile, 20% tetraethylammonium bromide and 10% water. The current density was 0.141 amp./cm.$^2$ for a reaction time of 180 minutes, during which time brown, catholyte-insoluble dialkyltin composition precipitated and soluble tetra(n-propyl)tin accumulated in the catholyte. The electricity consumed was 10.4 electrons per tin atom lost from the cathode, attributed to inefficiences inherent in the operation of a small scale system.

Example 11

Example 10 was repeated using isopropyl bromide as the alkylating agent at a current density of 0.134 amp./cm.$^2$ for 150 minutes during which time brown catholyte-insoluble dialkyltin product and catholyte-soluble alkyltin compounds acumulated in the reactor.

Example 12

The general procedure and cell of Example 1 was followed using a catholyte consisting of 10% n-butylbromide, 10% tetraethylammonium bromide, 1% water and 79% acetonitrile and an anolyte consistng of 35% tetraethylammonium bromide, 10% water and 55% acetonitrile. The current density was 0.0525 amp./cm.$^2$ for a reaction time of 120 minutes at 20–30° C.

During the electrolysis the catholyte first became a clear amber, which progressed to a dark brown, with dark brown solid polymeric dibutyltin settling out in the catholyte recirculation reservoir, and the cathode lost 9.4 grams of tin. The total catholyte composition, including that collected in the reservoir, was aerated by sparging with a stream of air until the color of the resulting solid dibutyltin oxide product became nearly white. The dibutyltin oxide, after being filtered off, washed with water then acetone, and dried, weighed 4 grams, corresponding to a 20% yield based on the cathode tin consumed.

The filtrate (liquid portion of the catholyte) contained soluble tin compounds including tetrabutyltin and tributyltin chloride.

Example 13

This example illustrates the direct preparation of dimethyltin dibromide using dimethyltin dibromide as the sole current-carrer. The cell is an undivided cell, with means for circulating the electrolyte through it, essentially as described in Example 7. 1000 Grams of electrolyte consisting of 30% methyl bromide, 65% acetonitrile, 3% glycerol and 2% dimethyltin dibromide was circulated through the cell while being electrolyzed at a current density of 0.1 amp./ cm.$^2$ for 60 minutes. During the run the electrolyte became deep orange, attributed to polybromide ion, and the temperature rose to 41° C. from 8° C. initially. 13.3 Grams of tin was consumed from the cathode. The resulting electrolyte contained 2.53% soluble tin compounds. Gas chromatographic analysis showed that 23% of the tin was in the form of newly produced dimethyltin dibromide and 30% as trimethyltin bromide.

The foregoing detailed description has been given for clarity of understanding only and no unnecessary limitations are to be understood therefrom. The inbention is not limited to exact details shown and described for obvious modifications will occur to one skilled in the art.

The embodiments of the invention in which an exclusive property or privilege is claimed are defined as follows:

1. A process for preparing divalent dialkyltin compositions in catholyte-insoluble form comprising electrolyzing a C$_2$–C$_{10}$ alkyl chloride or bromide in a liquid catholyte in contact with a tin cathode by passing a direct current between said cathode and an anode while maintaining a permselective current-permeable membrane between said cathode with supporting catholyte and said anode with supporting anolyte at a current density of from about 0.02 to 0.2 amp./cm.$^2$, the electrolysis being coordinated so that substantially less than 4 electrons are consumed per atom of tin lost from the cathode.

2. A process according to Claim 1 wherein the current density is at least 0.05 amp./cm.$^2$.

3. A process according to Claim 1 wherein the liquid catholyte consists essentially of the alkyl halide, a current-carrier providing chloride or bromide ion and a solvent for said current-carrier and alkyl halide.

4. A process according to Claim 3 wherein the alkyl halide is a C$_{4-8}$ primary alkyl chloride or bromide, the catholyte current-carrier is tetraalkyl ammonium chloride or bromide wherein each alkyl has from 1–4 carbon atoms, and the anolyte comprises a current-carrying amount of a tetra (C$_1$–C$_4$ alkyl) ammonium chloride or bromide and a solvent for such halide which is less anodically oxidizable than said halide.

5. A process according to Claim 4 wherein the catholyte solvent consists essentially of a C$_1$–C$_4$ alkanonitrile and wherein the anolyte current carrier is a tetra (C$_1$–C$_2$ alkyl) ammonium bromide and the solvent is selected from at least one member of the group consisting of water, C$_1$–C$_4$ alkanol and C$_1$–C$_4$ alkanonitrile.

6. A process according to Claim 5 wherein the C$_1$–C$_4$ alkanonitrile is acetonitrile and the catholyte current-carrier is tetraalkyl ammonium chloride wherein each alkyl has 1–2 carbon atoms.

7. A process according to Claim 6 wherein the alkyl halide of the liquid catholyte is n-butyl chloride, said catholyte consistng essentally of from 5–35% by weight of n-butyl chloride, from 1–20% by weight of current-carrier, the remainder being solvent.

8. A process according to Claim 6 wherein the alkyl halide of the liquid catholyte is n-octyl chloride, said catholyte consisting essentially of from 5–35% by weight of n-octyl chloride, from 1–20% by weight of current-carrier, the remainder being solvent.

9. A process according to claim 1 comprising additionally the steps of
(a) oxidizing the divalent dialkyltin to the corresponding dialkyltin oxide, and
(b) recovering said oxide.

10. A process according to Claim 9 wherein the dialkyltin is oxidized with a molecular oxygen-containing gas.

11. A process according to Claim 9 wherein the liquid catholyte consists essentially of the alkyl halide, a current-carrier providing chloride or bromide ions and a solvent for said current-carrier and said alkyl halide.

12. A process according to Claim 11 wherein the alkyl halide is a $C_{4-8}$ primary alkyl chloride or bromide, the current-carrier is tetraalkyl ammonium halide wherein each alkyl has from 1–4 carbon atoms, the solvent consists essentially of a $C_1$–$C_4$ alkanonitrile, and the anolyte comprises a current-carrying amount of a tetra ($C_1$–$C_4$) alkyl ammonium chloride or bromide and a solvent for such halide which is less anodically oxidizable than said halide.

13. A process according to Claim 12 wherein the alkanonitrile is acetonitrile, the tetraalkyl ammonium halide is tetra ($C_1$–$C_2$ alkyl) ammonium chloride or bromide, and wherein the liquid catholyte consists essentially of from 5–35% by weight alkyl halide, from 1–20% by weight of current-carrier, the remainder being solvent, and wherein the anolyte current-carrier is a tetra ($C_1$–$C_2$ alkyl) ammonium bromide and the solvent is at least one member of the group consisting of water, $C_1$–$C_4$ alkanol and $C_1$–$C_4$ alkanonitrile.

14. A process according to Claim 13 wherein the alkyl chloride is n-butyl chloride.

15. A process according to Claim 13 wherein the alkyl chloride is n-octyl chloride.

16. A process according to Claim 13 wherein the alkyl halide is n-butyl bromide.

17. A process for preparing dialkyltin oxides which comprises
(a) electrolyzing a $C_2$–$C_{10}$ alkyl chloride or bromide in a liquid catholyte in contact with a tin cathode, separated from a suitable cell-balancing anode and anolyte by a permselective current-permeable membrane, at a current density in the range 0.02 to 0.2 amp./cm.$^2$, the alkyl halide composition and the current density being coordinated to result in the reduction of alkyl halide with consumption of cathodic tin and less than 4 electrons per atom of tin lost from the cathode, and
(b) contacting the resulting catholyte composition in situ with a molecular oxygen-containing gas.

18. A process according to Claim 17 comprising additionally the step of recovering the dialkyltin oxide produced by, decantation, centrifugation or filtration of the treated catholyte.

19. A process according to Claim 17 wherein the current density is at least 0.05 amp./cm.$^2$.

20. A process according to Claim 19 wherein the alkyl halide is a $C_4$–$C_8$ primary alkyl chloride or bromide.

21. A process according to Claim 20 wherein the catholyte consists essentially of said alkyl halide, a tetra ($C_1$–$C_4$ alkyl) ammonium chloride or bromide current-carrier, and an inert solvent for said alkyl halide and current-carrier.

22. A process according to Claim 21 wherein the catholyte solvent is acetonitrile, and the anolyte comprises a current-carrying amount of a tetra ($C_1$–$C_2$ alkyl) ammonium bromide and the solvent is at least one member of the group water, $C_1$–$C_4$ alkanol and acetonitrile.

References Cited

UNITED STATES PATENTS

| | | | |
|---|---|---|---|
| 2,944,948 | 7/1960 | Giraitis | 204—59 QM |
| 3,197,392 | 7/1965 | Silversmith et al. | 204—59 QM |
| 3,630,858 | 12/1971 | Sanci et al. | 204—59 QM |
| 3,376,329 | 4/1968 | Kobitz et al. | 260—429.7 |
| 3,390,159 | 6/1968 | Katsumura et al. | 260—429.7 |

FOREIGN PATENTS

| | | | |
|---|---|---|---|
| 184,853 | 9/1966 | U.S.S.R. | 204—59 QN |

FREDERICK C. EDMUNDSON, Primary Examiner

U.S. Cl. X.R.

204—72